(12) United States Patent
McGee et al.

(10) Patent No.: US 10,065,628 B2
(45) Date of Patent: Sep. 4, 2018

(54) LOCATION ENHANCED DISTANCE UNTIL CHARGE (DUC) ESTIMATION FOR A PLUG-IN HYBRID ELECTRIC VEHICLE (PHEV)

(75) Inventors: Ryan Abraham McGee, Ann Arbor, MI (US); Hai Yu, Canton, MI (US); Johannes Geir Kristinsson, Ann Arbor, MI (US); Fazal Urrahman Syed, Canton, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1423 days.

(21) Appl. No.: 13/103,376

(22) Filed: May 9, 2011

(65) Prior Publication Data

US 2012/0290159 A1    Nov. 15, 2012

(51) Int. Cl.
*B60W 20/12*    (2016.01)
*B60W 10/08*    (2006.01)
(Continued)

(52) U.S. Cl.
CPC .............. *B60W 20/12* (2016.01); *B60K 6/445* (2013.01); *B60W 10/08* (2013.01); *B60W 10/26* (2013.01);
(Continued)

(58) Field of Classification Search
CPC ...... B60W 10/06; B60W 10/08; B60W 10/26; B60W 20/102; B60W 20/104; B60W 20/106; B60W 40/08; B60W 40/09;
B60W 2050/0078; B60W 2050/0089; B60W 2051/244; B60W 2530/14; B60W 2530/18; B60W 2710/244; B60W 2530/145;
(Continued)

(56) References Cited

U.S. PATENT DOCUMENTS 5,539,399 A    7/1996    Takahira et al.
5,778,326 A    7/1998    Moroto et al.
(Continued)

FOREIGN PATENT DOCUMENTS

EP    0548748 B1    9/1995
KR    20040022743 A    3/2004

OTHER PUBLICATIONS

Reid Simmons et al., Learning to Predict Driver Route and Destination Intent, 2006 IEEE Intelligent Transportation Systems Conference, Proceedings of the IEEE ITSC 2006, Sep. 17-20, 2006, pp. 127-132, Toronto, Canada.*

*Primary Examiner* — Thomas G Black
*Assistant Examiner* — Sze-Hon Kong
(74) *Attorney, Agent, or Firm* — David B. Kelley; Brooks Kushman P.C.

(57) ABSTRACT

A method and a system augment or improve a distance until charge (DUC) estimation for a vehicle such as a plug-in hybrid electric vehicle (PHEV) by using location information. Such location information may be provided by a global positioning system (GPS) or the like associated with the vehicle. The method and the system generally estimate the DUC value as a function of past driving pattern historical data that is relevant to a current driving situation. To this end, the method and the system ignore past driving pattern historical data that is not relevant to the current driving situation when estimating the DUC value.

12 Claims, 5 Drawing Sheets

(51) Int. Cl.
*B60K 6/445* (2007.10)
*B60W 10/26* (2006.01)
*B60W 20/00* (2016.01)

(52) U.S. Cl.
CPC ....... *B60W 20/00* (2013.01); *B60W 2530/145* (2013.01); *B60W 2550/402* (2013.01); *B60W 2550/406* (2013.01); *B60W 2710/244* (2013.01); *B60Y 2400/214* (2013.01); *Y02T 10/6239* (2013.01); *Y02T 90/14* (2013.01)

(58) Field of Classification Search
CPC .............. B60W 2550/402; Y02T 10/52; Y02T 10/6213; Y02T 10/7044; Y02T 90/14; Y02T 90/162; Y02T 90/163; Y02T 90/165; B60L 11/1861; B60L 15/2045; B60L 11/1862; B60L 2240/62; B60L 2260/42; B60L 2260/46; B60L 2260/52; B60L 2260/54; B60L 11/02; G01C 21/3617; G01C 21/3469; H02J 7/0027
USPC .................................................. 701/22, 123
See application file for complete search history.

(56) References Cited

U.S. PATENT DOCUMENTS

| | | | |
|---|---|---|---|
| 5,815,824 A | 9/1998 | Saga et al. | |
| 5,892,346 A * | 4/1999 | Moroto .................. | B60K 6/485 318/139 |
| 6,242,873 B1 | 6/2001 | Drozdz et al. | |
| 6,721,653 B2 | 4/2004 | Watanabe et al. ............. | 701/457 |
| 7,659,698 B2 | 2/2010 | Elder et al. | |
| 7,849,944 B2 * | 12/2010 | DeVault ..................... | 180/65.29 |
| 8,229,611 B2 * | 7/2012 | Yamada .......................... | 701/22 |
| 8,374,784 B2 * | 2/2013 | Mazlum et al. .............. | 701/469 |
| 8,417,401 B2 * | 4/2013 | Takahara et al. ................ | 701/22 |
| 8,554,464 B2 * | 10/2013 | Zetune .......................... | 701/400 |
| 8,572,008 B2 * | 10/2013 | Ide et al. ......................... | 706/12 |
| 2002/0188387 A1 | 12/2002 | Woestman et al. | |
| 2003/0015874 A1 * | 1/2003 | Abe et al. ................... | 290/40 C |
| 2005/0154508 A1 | 7/2005 | Honda | |
| 2005/0228553 A1 | 10/2005 | Tryon | |
| 2007/0090937 A1 * | 4/2007 | Stabler ...................... | G07C 5/08 340/450.2 |
| 2007/0112475 A1 * | 5/2007 | Koebler et al. ................... | 701/1 |
| 2007/0112484 A1 | 5/2007 | Lee | |
| 2008/0021628 A1 | 1/2008 | Tryon | |
| 2008/0084186 A1 | 4/2008 | Elder et al. | |
| 2008/0093136 A1 | 4/2008 | Miller | |
| 2008/0125265 A1 * | 5/2008 | Conlon et al. .................... | 475/5 |
| 2008/0262667 A1 * | 10/2008 | Otabe ............................. | 701/22 |
| 2008/0262668 A1 * | 10/2008 | Yamada .......................... | 701/22 |
| 2009/0114463 A1 | 5/2009 | DeVault | |
| 2009/0313098 A1 * | 12/2009 | Hafner et al. ................ | 705/14.1 |
| 2010/0039067 A1 * | 2/2010 | Hill ............................. | B60L 5/42 320/109 |
| 2010/0164439 A1 * | 7/2010 | Ido ................................ | 320/155 |
| 2010/0185357 A1 * | 7/2010 | Mizumachi ..................... | 701/33 |
| 2010/0204863 A1 * | 8/2010 | Sakamoto et al. .............. | 701/22 |
| 2010/0280678 A1 * | 11/2010 | Tate, Jr. ............... | B60L 11/1824 700/297 |
| 2011/0029168 A1 * | 2/2011 | Talberg .................... | B60K 6/48 701/22 |
| 2011/0087390 A1 * | 4/2011 | Pandit et al. .................... | 701/22 |
| 2011/0137833 A1 * | 6/2011 | Ide et al. ......................... | 706/12 |
| 2011/0166774 A1 * | 7/2011 | Schunder ........... | G01C 21/3469 701/533 |
| 2011/0202219 A1 * | 8/2011 | Ishibashi ......................... | 701/22 |
| 2011/0213520 A1 * | 9/2011 | Yaguchi ................ | B60L 11/184 701/22 |
| 2011/0224900 A1 * | 9/2011 | Hiruta et al. ................. | 701/201 |
| 2011/0227532 A1 * | 9/2011 | Niwa ............................ | 320/109 |
| 2011/0264317 A1 * | 10/2011 | Druenert et al. ................ | 701/22 |
| 2012/0041622 A1 * | 2/2012 | Hermann et al. ............... | 701/22 |
| 2012/0065831 A1 * | 3/2012 | Ross ................... | B60L 11/1816 701/29.1 |
| 2012/0078706 A1 * | 3/2012 | Rajagopalan ................ | 705/14.41 |
| 2012/0109413 A1 * | 5/2012 | Smith .................. | B60L 11/1877 701/1 |
| 2012/0123670 A1 * | 5/2012 | Uyeki ............................ | 701/300 |
| 2012/0136865 A1 * | 5/2012 | Blom et al. ..................... | 707/739 |
| 2012/0158227 A1 * | 6/2012 | Tate, Jr. .................. | B60K 6/46 701/22 |
| 2012/0181982 A1 * | 7/2012 | Fecher ........................... | 320/109 |
| 2012/0286725 A1 * | 11/2012 | Gullapalli et al. ............. | 320/108 |
| 2013/0173097 A1 * | 7/2013 | Jotanovic ........... | G01C 21/3469 701/22 |
| 2013/0331987 A1 * | 12/2013 | Karlsson et al. ............. | 700/253 |

* cited by examiner

LOCATION ENHANCED DISTANCE UNTIL CHARGE (DUC) ESTIMATION FOR A PLUG-IN HYBRID ELECTRIC VEHICLE (PHEV)

TECHNICAL FIELD

The present invention relates to estimating the distance that a plug-in hybrid electric vehicle (PHEV) will be driven until its next charging event.

BACKGROUND

A hybrid electric vehicle (HEV) includes two power sources for delivering power to propel the vehicle. Typically, the first power source is an engine which consumes fuel to deliver power and the second power source is a battery which stores and uses electric energy stored to deliver power.

A plug-in hybrid electric vehicle (PHEV) is an extension of HEV technology. The PHEV battery has a larger capacity and is rechargeable from an external electric grid.

A HEV and a PHEV buffer fuel energy and recover kinematic energy in electric form to improve the fuel efficiency. For a HEV, fuel for the engine is the principal energy source. A PHEV has an additional principal energy source—the electric energy stored in the battery from the grid after a charging event.

A HEV is typically operated to maintain a state of charge (SOC) of the battery near a constant charge level. In contrast, a PHEV is expected to use as much electric energy as possible before the next charging event; i.e. the relatively low-cost grid supplied electric energy is expected to be fully used after a charging event.

To this end, two basic operating modes for a PHEV include a charge depleting (CD) mode and a charge sustaining (CS) mode. During a first travel distance after a charging event, the fully/partially charged PHEV is driven in the CD mode, where primarily the electric energy is used to propel the vehicle, gradually depleting the battery SOC. In particular, a vehicle system controller or the like decides the power sourcing proportioning between the fuel and the electric energy to meet the propulsion requirements of the driver with the use of the electric energy being prioritized. Once the battery SOC decreases to a predefined charge sustaining SOC level, the PHEV is driven in the CS mode. In the CS mode, the battery SOC is kept near the charge sustaining level and the vehicle is mainly powered by the engine (i.e., fuel energy) as is done in typical HEV operation.

The fuel economy of a PHEV can be optimized if the battery usage is adapted for the exact distance that the vehicle will be driven until the next charging event. In particular, the fuel economy of a PHEV can be optimized if the CD mode operation is extended to the exact distance that the vehicle will be driven until the next charging event.

SUMMARY

In an embodiment, a method is provided. The method includes estimating a distance until charge (DUC) value for a vehicle based on stored information for a prior recharge at the same location as a current recharge.

The method may further include storing, for each of a plurality of past charging events of the vehicle, information indicative of the location of the past charging event and distance traveled by the vehicle since the past charging event until the next charging event, and obtaining the location of a current charging event of the vehicle. In this case, estimating a DUC value includes estimating the DUC value based on the stored information for each past charging event having the same location as the current charging event.

In an embodiment, a system is provided. The system includes a controller configured to estimate a distance until charge (DUC) value for a vehicle based on stored information for a prior recharge at the same location as a current recharge.

The system may further include a database and a global positioning system (GPS). The database is configured to store, for each of a plurality of past charging events of the vehicle, information indicative of the location of the past charging event and distance traveled by the vehicle since the past charging event until the next charging event. The GPS is configured to obtain the location of a current charging event of the vehicle. In this case, the controller is further configured to estimate the DUC value based on the stored information for each past charging event having the same location as the current charging event.

In an embodiment, another method is provided. The method includes storing, for each of a plurality of past charging events of a vehicle, information indicative of the location of the past charging event, the location of the next charging event after the past charging event, and distance traveled by the vehicle from the location of the past charging event until the next charging event. The method further includes generating from the stored information a probability matrix indicative of the probability of the location of the next charging event for each location of the past charging events. The method further includes generating from the stored information a journey matrix indicative of the distance traveled by the vehicle from each location of the past charging events until the corresponding next charging events. The method further includes obtaining the location of a current charging event of the vehicle. The method further includes estimating a distance until charge (DUC) value of the vehicle based on information of the probability matrix and the journey matrix for each past charging event having the same location as the current charging event.

DETAILED DESCRIPTION

Figure 1:
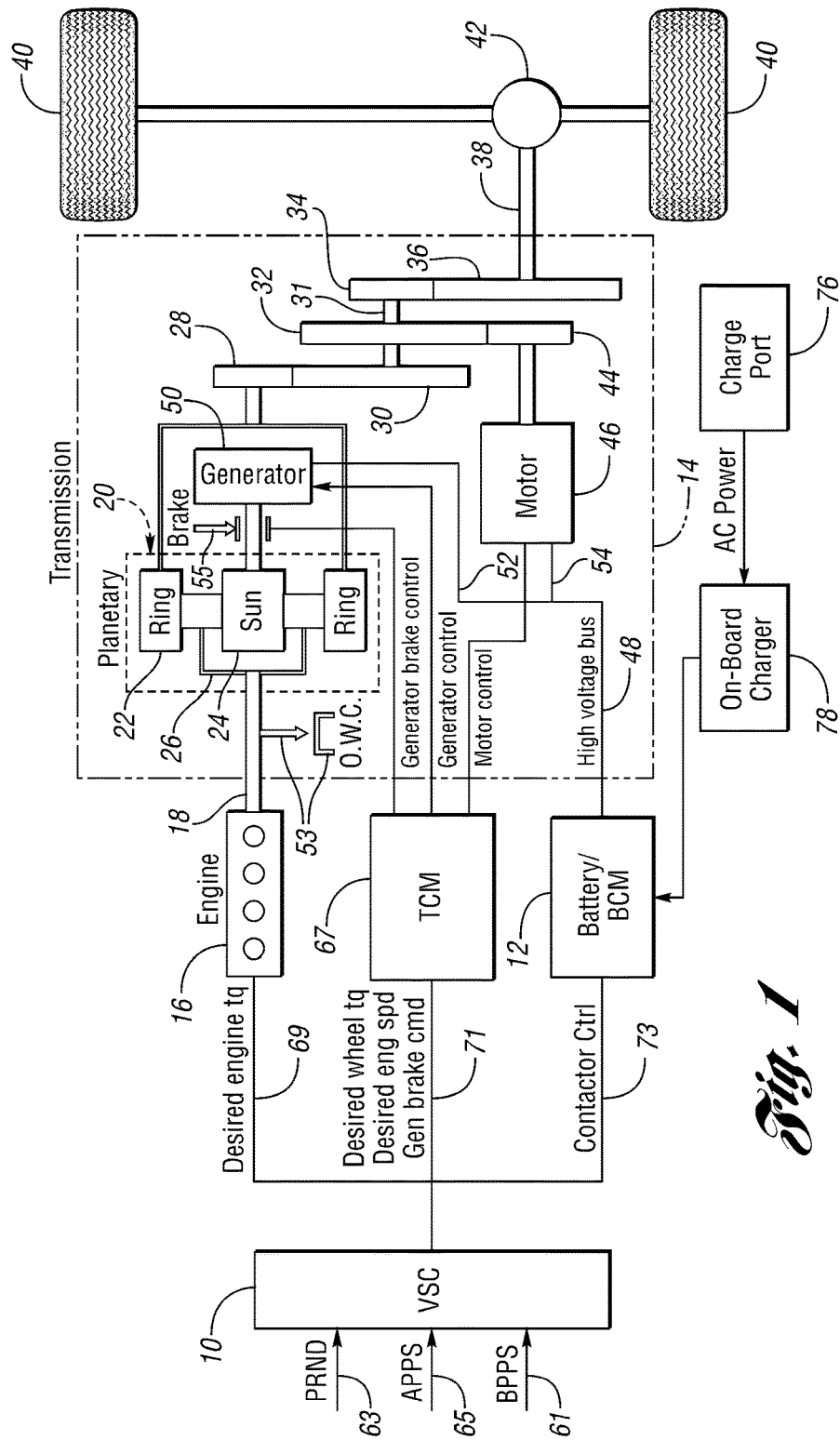
FIG. 1 illustrates a schematic representation of a plug-in hybrid electric vehicle (PHEV) powertrain capable of embodying the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Detailed embodiments of the present invention are disclosed herein; however, it is to be understood that the disclosed embodiments are merely exemplary of the present invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

As indicated above, the fuel economy of a plug-in hybrid electric vehicle (PHEV) can be optimized if the battery usage is adapted for the exact distance that the vehicle will be driven until the next charging event. That is, there is an opportunity for fuel economy improvement in a PHEV if the charge depleting (CD) mode is extended for the duration of the journey. In this context, a journey is a collection of one or more individual driving trips between two immediate charging events. Estimating or predicting an accurate "Distance until Charge" (DUC) value, where the DUC value reflects the distance from a current position that the vehicle is intended to be driven until the next charging event, enables taking advantage of this fuel economy opportunity.

Embodiments of the present invention, as described in detail below, provide methods for estimating the DUC value of a PHEV. The DUC value is to be used by a battery usage optimization system of the PHEV to optimize the battery usage. The battery usage optimization system is implemented by, for example, the vehicle system controller of the PHEV.

In operation, the controller adapts the battery usage as a function of the DUC value such that the vehicle is operated in the CD mode the entire distance the vehicle is intended to be driven until the next charging event to thereby improve the overall fuel economy. For instance, the controller may adapt the battery usage based on the DUC value such that, once the vehicle is driven the intended distance, the battery SOC will have depleted to the predefined charge sustaining SOC level. At this point, if the vehicle should happen to be driven farther before the next charging event, then the vehicle is operated in the charge-sustaining (CS) mode. Overall, armed with a DUC value corresponding to the exact distance that the vehicle will be driven until the next charging event, the controller adapts the battery usage effectively as a function of such exact distance.

One way to estimate the DUC value includes asking the vehicle driver to input a DUC value that the driver believes to be accurate. This can be understood as the driver generally knows where the vehicle will be driven until the next charging event. The driver may input the DUC value through an input device of the vehicle such as a HMI screen, a dedicated dial type interface, or the like. A variation includes estimating the DUC value based on route information programmed by the driver into a navigation system of the vehicle. A problem is that many drivers do not want to enter DUC information into a dedicated HMI or navigation system for every journey. Additionally, in the case of estimating the DUC value from information of a navigation system, a journey can contain multiple trips and the navigation system is typically used for a single trip.

Another way to estimate the DUC value includes estimating the DUC value based on past driving patterns. This can be understood as most drivers typically follow a weekly schedule. As such, it is possible to predict a DUC value based on historical vehicle usage data such as Time of Day (TOD) and Day of Week (DOW) information indicative of when the vehicle is driven and 'Distance between Charges' (DBC) information, where an individual DBC value is the distance the vehicle has been driven between two immediate charging events. A problem is that drivers do not always follow a perfectly repeatable schedule. For example, a driver may take a day off of work, take a vacation, or drive to a meeting in a different location.

Embodiments of the present invention are directed to augmenting or improving the DUC estimation by using location (e.g., Global-Positioning System (GPS)) information. In particular, certain embodiments of the present invention are directed to providing improved ways to augment the past driving pattern historical data based DUC value estimation described above.

A method in accordance with a first embodiment of the present invention employs location based pre-filtering of historical data of past driving patterns (e.g., the TOD and DOW information) in estimating a DUC value. As such, this method is directed to location based filtering for the past driving pattern historical data based DUC value estimator.

A method in accordance with a second embodiment of the present invention employs a charging event location transition probability to estimate a DUC value. This method is directed to employing learned charging event location and Markov Chain transition probability model analysis in estimating the DUC value.

Referring now to FIG. 1, a schematic representation of a plug-in hybrid electric vehicle (PHEV) powertrain capable of embodying the present invention is shown. The powertrain includes two power sources that are connected to the driveline: 1) an engine 16 and a generator 50 connected together via a planetary gear arrangement 20 and 2) an electric drive system including a battery 12, an electric motor 46, and generator 50. Battery 12 is an energy storage system for motor 46 and generator 50.

Battery 12 is rechargeable from a power source residing external the vehicle (e.g., an external electric grid). Battery 12 periodically receives AC electrical energy from the grid via a charge port 76 connected to the grid. An on-board charger 78 receives the AC electrical energy from charge port 76. Charger 78 is an AC/DC converter which converts the received AC electrical energy into DC electrical energy suitable for charging battery 12. In turn, charger 78 supplies the DC electrical energy to battery 12 in order to charge battery 12 during the recharging operation (i.e., a charging event).

A vehicle system controller (VSC) 10 is configured to send control signals to and receive sensory feedback information from one or more of battery 12, engine 16, motor 46, and generator 50 in order for power to be provided to vehicle traction wheels 40 for propelling the vehicle. Controller 10 controls the power source proportioning between battery 12 and engine 16 for providing power to propel the vehicle and thereby controls the state of charge (SOC) of battery 12.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to wheels 40 through a differential-and-axle mechanism 42.

Gears 30, 32, and 34 are mounted on a counter shaft 31 with gear 32 engaging a motor-driven gear 44. Motor 46 drives gear 44. Gear 44 acts as a torque input for counter shaft 31.

Engine 16 distributes torque through input shaft 18 to transmission 14. Battery 12 delivers electric power to motor 46 through power flow path 48. Generator 50 is connected electrically to battery 12 and to motor 46, as shown at 52.

While battery 12 is acting as a sole power source with engine 16 off, input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the powertrain is in a parallel drive mode, sun gear 24 acting as a reaction element.

Controller 10 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. Controller 10 issues a desired engine torque request to engine 16, as shown at 69, which is dependent on accelerator pedal position sensor (APPS) output 65.

A brake pedal position sensor (BPPS) distributes a wheel brake signal to controller 10, as shown at 61. A brake system control module (not shown) may issue to controller 10 a regenerative braking command based on information from the BPPS. TCM 67 issues a generator brake control signal to generator brake 55. TCM 67 also distributes a generator control signal to generator 50.

Figure 2:
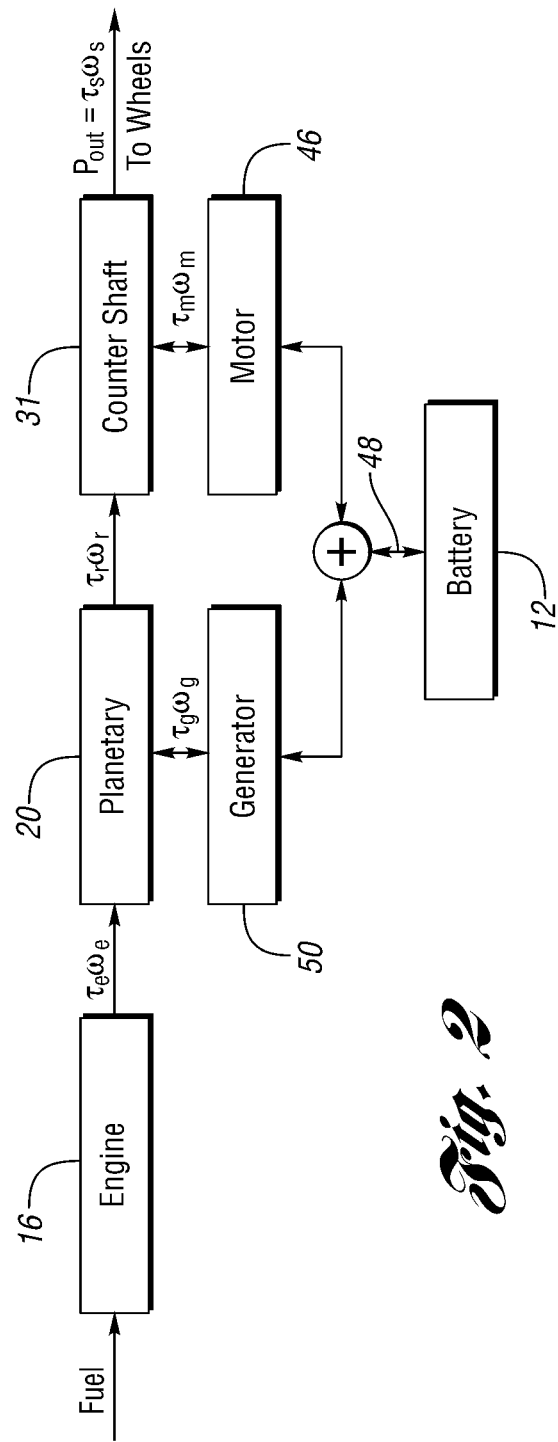
FIG. 2 illustrates a block diagram of power flow in the powertrain shown in FIG. 1.

Referring now to FIG. 2, a block diagram of power flow paths between the various components of the powertrain of FIG. 1 is shown. Fuel is delivered to engine 16 under the control of the driver using an engine throttle. Engine 16 delivers engine power ($\tau_e \omega_e$, where $\tau_e$ is engine torque and $\omega_e$ is engine speed) to planetary 20. Planetary 20 delivers power $\tau_r \omega_r$, (where $\tau_r$ is the ring gear torque and $\omega_r$ is the ring gear speed) to counter shaft 31. Output shaft 38 outputs power ($P_{out} = \tau_s \omega_s$, where $\tau_s$ and $\omega_s$ are the torque and speed of output shaft 38, respectively) to wheels 40. Generator 50 can deliver power to or be driven by planetary 20. Similarly, power distribution between motor 46 and counter shaft 31 can be distributed in either direction. Driving power from battery 12 or charging power to battery 12 is represented by the bi-directional arrow 48.

The engine output power ($\tau_e \omega_e$) can be split into a mechanical power flow path ($\tau_r \omega_r$) and an electrical power flow path ($\tau_g \omega_g$ to $\tau_m \omega_m$, where $\tau_g$ is the generator torque, $\omega_g$ is the generator speed, $\tau_m$ is the motor torque, and $\omega_m$ is the motor speed). In this so-called positive split mode of operation, engine 16 delivers power to planetary 20 which delivers power ($\tau_r \omega_r$) to counter shaft 31 which in turn drives wheels 40. A portion of the planetary gearing power ($\tau_g \omega_g$) is distributed to generator 50, which delivers charging power to battery 12. Battery 12 drives motor 46, which distributes power ($\tau_m \omega_m$) to counter shaft 31.

If generator brake 55 is activated, a parallel operating mode is established. In the parallel operating configuration, engine 16 is on and generator 50 is braked. Battery 12 powers motor 46, which powers counter shaft 31 simultaneously with delivery of power from engine 16 to planetary 20 to counter shaft 31.

During operation with the second power source (previously described as including battery 12, motor 46, and generator 50), motor 46 draws power from battery 12 and provides propulsion independently from engine 16 to the drivetrain.

As described, the powertrain has two power sources for delivering driving power to wheels 40. The first power source generally includes engine 16 and the second power source generally includes battery 12. As further described, engine 16 and battery 12 can provide traction power either simultaneously or independently.

As indicated above, methods in accordance with embodiments of the present invention are directed to estimating the DUC value of a PHEV. A general concept employed by the methods is that future behavior can be predicted using past data. However, the methods take into account that only past data relevant for the current situation should be used for predicting the future behavior. To this end, methods in accordance with embodiments of the present invention consider the location where the vehicle is charged to thereby filter out data that is not relevant for the current situation prior to estimating the DUC value. For example, if a driver lives in city A and commutes to city B regularly and vacations in city C now and then, then past driving pattern data associated with city C is filtered out prior to estimating the DUC value. The reason being is that it is reasonable to assume that while the vehicle is at city C the distance driven will be different because the driver will have different driving habits while on vacation.

Figure 3:
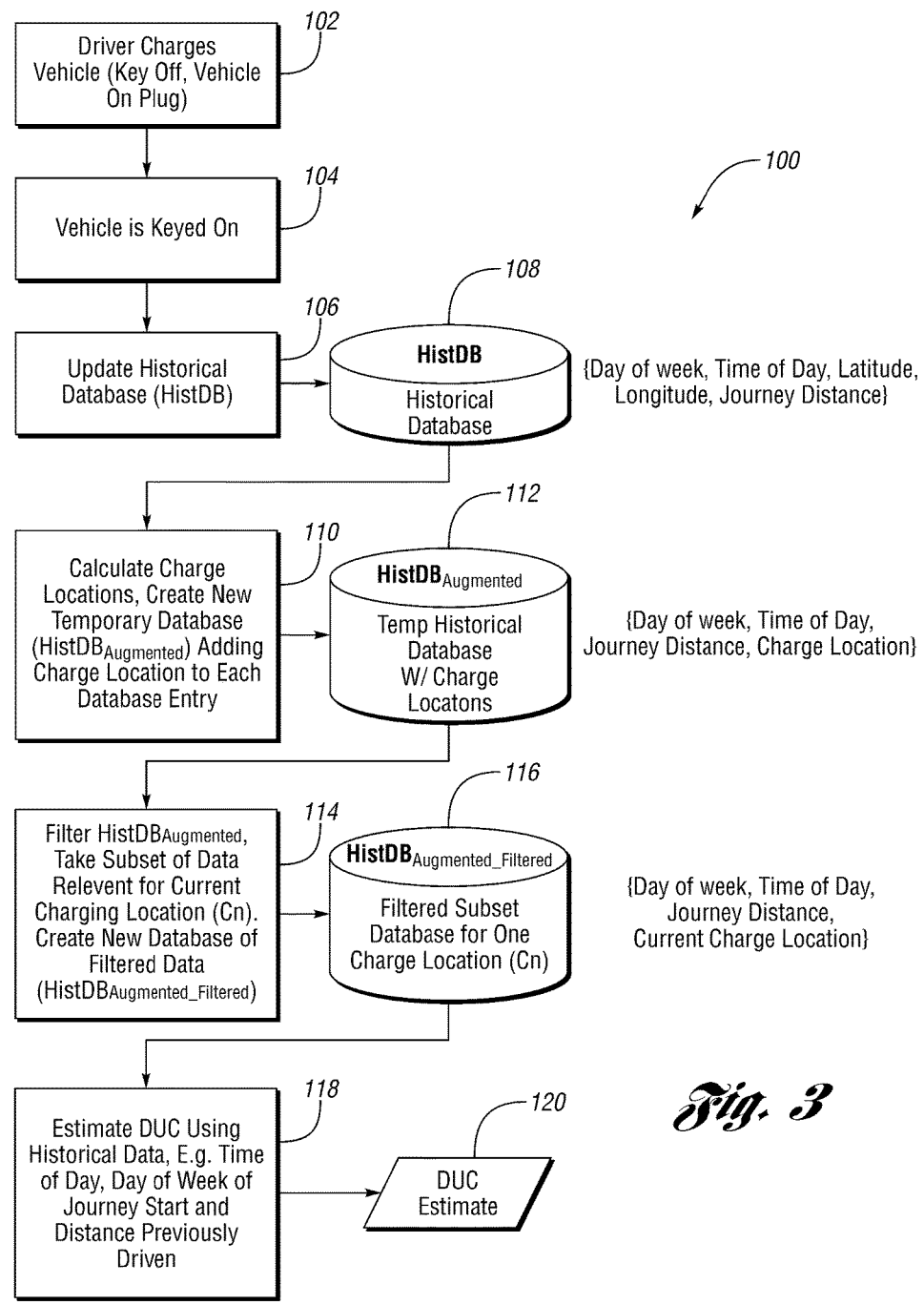
FIG. 3 illustrates a flow chart describing operation of a method for estimating a "Distance until Charge" (DUC) value of a PHEV in accordance with a first embodiment of the present invention.

Referring now to FIG. 3, a flow diagram 100 describing operation of a method for estimating the DUC value of a PHEV in accordance with a first embodiment of the present invention is shown. As indicated above, this method employs location based pre-filtering of past driving pattern historical usage data in estimating the DUC value. Briefly, operation processes of this method are implemented by, for instance, controller 10 of the PHEV.

The operation begins with the vehicle being parked and battery charging being initiated as shown in block 102. After the charging is completed the driver starts the vehicle as shown in block 104. The operation then proceeds to updating a historical database (HistDB) 108 as indicated at block 106.

Briefly, historical database 108 is updated over time as the vehicle is used to include a plurality of records. Each record is associated with a respective charging event and contains information regarding that charging event. The information regarding a charging event includes temporal information such as the Day of Week (DOW) and Time of Day (TOD) when the charging event occurred, location information indicative of where the charging event occurred, and distance information indicative of the distance driven by the vehicle between the charging event and the immediate subsequent charging event (i.e., the journey distance).

The DOW and TOD information for a charging event can be derived from monitoring when the charging event is completed (i.e., when the vehicle is keyed on after a charging event pursuant to block 104). The location information for a charging event (i.e., the charge location) can be derived from latitude and longitude position information provided by a GPS indicating where the vehicle is located while being charged (i.e., the location of the vehicle when the vehicle is being charged pursuant to block 102 is the charge location). The journey distance can be derived from the GPS information or by monitoring the odometer or the like to determine the distance that the vehicle has been driven between the charging event and the immediate subsequent charging event. As a "journey" is a collection of trips between two immediate charging events, the journey distance between an immediate previous charging event and a current charging event can only be determined when the current charging event (i.e., block 102) takes place.

Accordingly, prior to being updated at block 106, historical database 108 includes a plurality of records. Each record is associated with a respective past charging event done prior to the current charging event in block 102. As such, one of the records is associated with the past charging event immediately preceding the current charging event. Each record for a past charging event, other than the record for the immediate preceding charging event, includes information indicative of when the charging event occurred (e.g., DOW and TOD information), where the charging event occurred (i.e., the charge location), and the journey distance driven by the vehicle between the charging event and the immediate previous charging event. The record for the past charging event immediately preceding the current charging event includes the same information with the exception of the journey distance. This record does not contain the journey distance as such journey distance cannot be determined until the current charging event occurs.

The operation of updating historical database 108 as indicated at block 106, which occurs after the current charging event of block 102 completes, includes determining the journey distance for the past charging event immediately preceding the current charging event. The updating of historical database 108 includes updating the record of this immediate preceding charging event with the journey distance. The updating of historical database 108 further includes entering a new record for the current charging event. The new record for the current charging event is filled in with information indicative of when the current charging event occurred (e.g., DOW and TOD information taken when the vehicle is being charged in block 102) and where the current charging event occurred (i.e., the charge location where the vehicle is being charged in block 102). The new record for the current charging event will not yet include its journey distance as such journey distance cannot be determined until the immediate subsequent charging event takes place. In the manner described above, the record for the current charging event will be updated to include the journey distance during a subsequent iteration of block 106 after the immediate subsequent charging event takes place (at which time, the current charging event will be the immediate past charging event and the immediate subsequent charging event will be the current charging event).

An augmented historical database (HistDB$_{Augmented}$) 112 is then created as shown in block 110. Augmented database 112 is created by adding charge location information for each record of historical database 108. Again, each record of historical database 108 corresponds to a charging event and includes position information (i.e., latitude and longitude) indicative of the location of vehicle when the charging event occurred. As such, the location of the vehicle when the charging event occurred corresponds to a particular charge location. In case historical database 108 only contains the latitude and longitude position information and not the actual charge location for each record, the operation of block 110 includes determining for each record the charge location based on the latitude and longitude position information of the record and then updating the record to include the determined charge location. As such, augmented historical database 112 includes a plurality of records each associated with a respective charging event. Each record for a charging event includes temporal information (i.e., DOW and TOD) of the charging event, the charge location of the charging event, and the journey distance associated with the charging event.

Augmented database 112 is filtered to create an augmented filtered historical database (HistDB$_{Augmented\_Filtered}$) 116 as shown in block 114. Filtered database 116 is created by filtering augmented database 112 to take only the subset of records in augmented database 112 which are relevant for the current charging location (Cn) of the vehicle. The current charging location (Cn) is the charging location where the vehicle is charged in block 102.

As such, filtered database 116 contains only those records for past charging events which were done at the current charging location (Cn). That is, each record in filtered database 116 respectively corresponds to a past charging event that started at the current charge location (Cn). Each record in filtered database 116 includes the temporal information and the journey distance for a respective charging event that was done at the current charge location. In contrast, as noted above, augmented database 112 includes the records for all of the charging events including those charging events done at the current charge location (Cn) and those charging events done at the other charge locations.

Filtered database 116 is then used to estimate a DUC value 120 as shown in block 118. To this end, DUC value 120 is estimated using the historical data of filtered database 116 for the current charging location (Cn), e.g., TOD and DOW of journey start and distance previously driven since the journey start. For example, DUC value 120 may be estimated as being the average or the mean of the journey distance of all of the records corresponding to the current charging location (Cn). In this case, DUC value 120 is the average or the mean of the journey distance that the vehicle has driven in the past when starting at the current charging location (Cn) until the next charging event. In this case, the charge location information is used and the TOD and DOW information is not used. Alternatively, DUC value 120 may be estimated as being the average or the mean of the journey distance of only those records which correspond to the current charging location (Cn) and correspond to the current TOD and/or DOW of the current charging event. In this case, DUC value 120 is the average or the mean of the journey distance that the vehicle has been driven in the past when starting at the current charging location (Cn), at a time and/or day corresponding to the time and/or day of the current charging event, until the next charging event. In this case, the charge location and the TOD and/or DOW information is used. In any event, controller 10 adapts usage of battery 12 based on the estimated DUC value 120 as described above.

Referring now to FIGS. 4, 5, 6, and 7, a method for estimating a DUC value for a PHEV in accordance with a second embodiment of the present invention will be described. As indicated above, this method employs charging event location transition probability in estimating a DUC value. In particular, the method is directed to employing learned charging event location and Markov Chain transition probability model analysis in estimating the DUC value. Again, operation processes of this method are implemented by, for instance, controller 10 of the PHEV.

The method in accordance with the second embodiment generally differs from the method in accordance with the first embodiment described above in that the second method considers another element, namely, the end of journey location. Since each journey begins and ends at a charge location, a transition probability matrix for a vehicle (or for an individual user of a shared vehicle) can be built. For each journey (a journey=sum of trips between two immediate charging events), the charge location start, the charge location end, and the amount of distance driven between the charge locations is kept track of. The DUC estimate is then calculated based on the transition probability matrix and historical distances driven between the charge locations.

Figures 4, 5, 6:
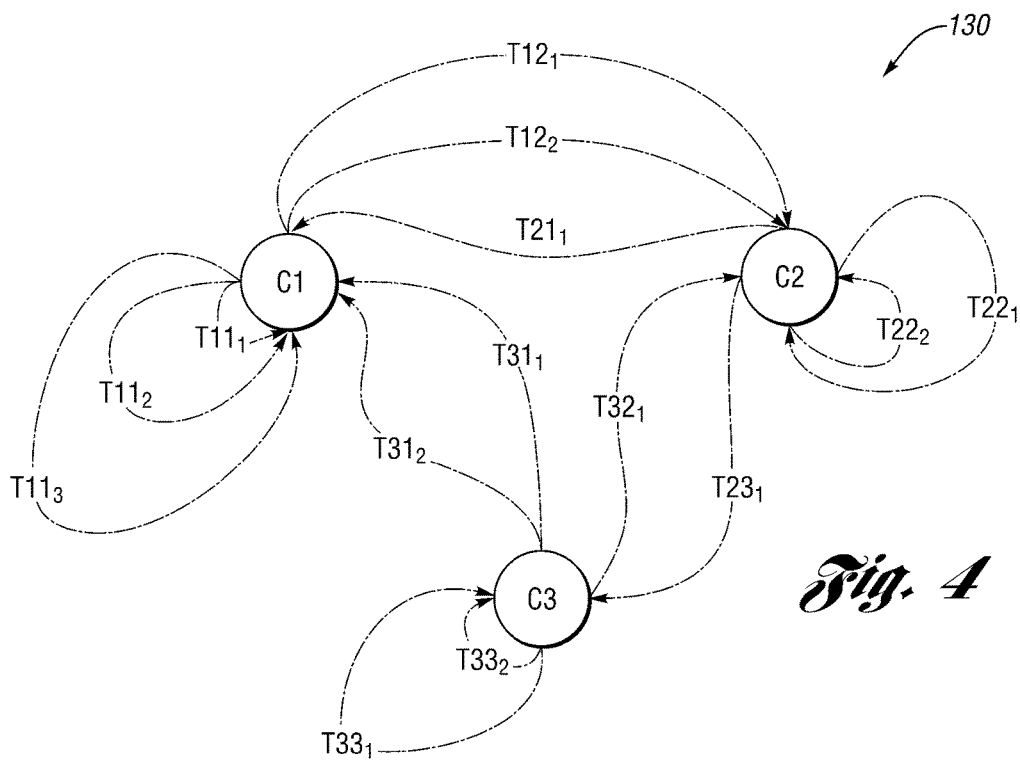
FIG. 4 illustrates an exemplary diagram indicative of a charging event location model definition in connection with a method for estimating a DUC value of a PHEV in accordance with a second embodiment of the present invention.
FIG. 5 illustrates a table modeling the transition probability matrix of the charging event location model shown in FIG. 4 as a Markov Chain.
FIG. 6 illustrates a table of a journey matrix based on the charging event location model shown in FIG. 4.

Referring now to FIG. 4, an exemplary diagram 130 indicative of a charging event location model definition in connection with the method for estimating a DUC value in accordance with the second embodiment of the present invention is shown. In this example, there are three charge locations identified in the historical data (C1, C2, C3) as indicated in diagram 130. Each journey is indicated in diagram 130 by a line starting at a charge location and ending at a charge location. It is possible (and likely) that many of the journeys begin and end at the same charge location. Of course, other journeys begin at one charge location and end at a different charge location.

In the example of diagram 130, the notation is "$Tab_n$", where a=charge location of journey start, b=charge location of journey end, and n=the index of journeys from charge location a to charge location b. In the example of diagram 130, there are three journeys from charge location C1 back to charge location C1, two journeys from charge location C1 to charge location C2, one journey from charge location C2 to charge location C1, and so on.

The transition probability matrix is modeled as a Markov Chain as in table 140 shown in FIG. 5. Each $P_{ab}$ in table 140 represents the probability of transitioning from charge location Ca to charge location Cb. The individual transition probabilities are calculated by: $P_{ab}$=the amount of journeys beginning at charge location Ca and ending at charge location Cb divided by the total amount of journeys originating from charge location Ca.

It is possible to pre-filter the data before calculating the transition probability matrix based on TOD and DOW historical usage data as described above with respect to FIG. 3. In this way, there will be less data, but the prediction should be more accurate if there is "enough" data. This assumes that a driver tends to use the vehicle in similar ways based on the TOD and DOW historical usage data.

A journey matrix as in table 150 shown in FIG. 6 is then developed. The journey matrix keeps track of the expected distance traveled for each transition. The values ($J_{ab}$) can be calculated in a number ways.

First, the historical database of information is queried and all of the past journeys from charge location Ca to charge location Cb are extracted. (If TOD and DOW historical usage pre-filtering is done, then only the journeys from charge location Ca to charge location Cb that relate to that relevant time period are used.) This subset of data is then processed to calculate each value ($J_{ab}$) in the journey matrix.

A first way to calculate the values ($J_{ab}$) of the journey matrix uses the following simple mean equation:

$$J_{ab} = \frac{\sum_{n=1}^{m} Tab_n}{m}$$

where m=the number of trips from charge location Ca to charge location Cb, and $Tab_n$ is the distance traveled on the $n^{th}$ journey from charge location Ca to charge location Cb.

This historical data can be pre-filtered to remove outliers such as, for example, the top and bottom ten percent of trips.

As an example, assume the following trip information for a driver that starts and ends at a charge location C1. The data could be: one trip of 2.5 miles; five trips of 7.5 miles; four trips of 10 miles; and one trip of 100 miles. The value of $J_{11}$ pursuant to the simple mean equation above is: $J_{11}$=(1*2.5+5*7.5+4*10+1*100)/(1+5+4+1)=16.37 miles.

Another way to calculate the values ($J_{ab}$) of the journey matrix employs a weighted mean analysis. The weighted mean analysis reduces the impact of a single element. A concern with the simple mean analysis described above is that a single long trip or a single short trip could significantly impact the mean. To lessen the impact, a weighted mean can be calculated which gives more importance to the bins that have more elements.

First the data is organized into bins. For example, 0-5 miles, 5-10 miles, 10-15 miles, etc. The bins can be arranged in a simple, evenly spaced way or the bins could be structured intelligently based on the patterns in the data.

The following weighted mean equation is used to calculate the values ($J_{ab}$) of the journey matrix.

$$J_{ab} = \frac{\sum_{k=1}^{l} (\Omega_k)^p x_k}{\sum_{k=1}^{l} (\Omega_k)^p}$$

where l=the total number of bins, $\Omega_k$ is the number of trips in the $k^{th}$ bin for the trips from charge location Ca to charge location Cb, p is a weighting factor, $x_k$ is the mean of the trips within the $k^{th}$ bin for the trips from charge location Ca to charge location Cb. The weighted mean equation provides more impact to the bins that have more elements in them than the bins with a smaller number of elements.

Using the same data from the example above explaining the simple mean equation, the value of $J_{11}$ pursuant to the weighted mean equation is a lower value. In particular, the value of $J_{11}$ according to the weighted mean equation (with weighting factor p=2) is: $J_{11}$=($1^2$*2.5+$5^2$*7.5+$4^2$*10+$1^2$*100)/($1^2$+$5^2$+$4^2$+$1^2$))=10.47 miles. The assumption is that there are four bins with one bin for each trip length. Accordingly, the weighted mean analysis results in a lower number because the relative importance of the 2.5 mile and 100 mile trips is reduced.

Through either of the simple mean process or the weighted mean process, a journey matrix is constructed. Each element in the journey matrix represents an estimate of the distance the vehicle is driven between charge locations. Table 150 shown in FIG. 6 is an example of the expected journey distances between charge locations.

The final estimated DUC value is then calculated based on the journey matrix (represented by table 150 shown in FIG. 6) and the probability matrix (represented by table 140 shown in FIG. 5). There are several processes that can be used for the DUC value calculation.

One process employs an expected value analysis. In this process, the DUC value is calculated based on the following simple mathematical formula for Expected Value (EV):

$$DUC_a = \sum_{b=1}^{n} P_{ab} J_{ab}$$

where $DUC_a$ is the estimated distance until charge for charge location $C_a$, and n=total number of charge locations. As an example, assuming that the driver keys on the vehicle after charging at charge location C1, the DUC value is calculated using the EV equation as follows: $DUC_1=P_{11}*J_{11}+P_{12}*J_{12}+P_{13}*J_{13}$.

Another process of the DUC value calculation employs high probability analysis. This process looks through the probability matrix and picks the element with the highest probability. Then the corresponding distance value is taken from the journey matrix.

Figure 7:
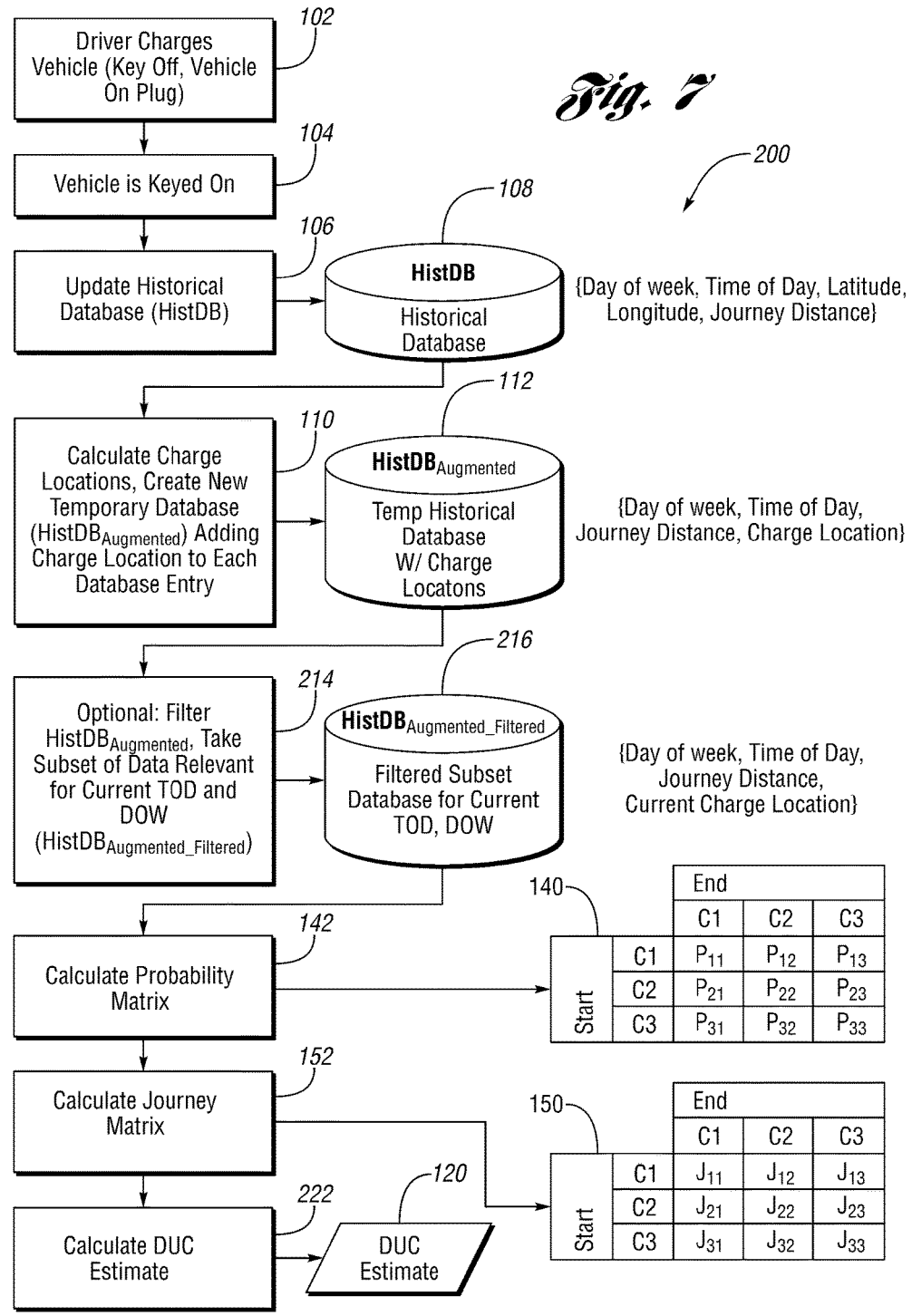
FIG. 7 illustrates a flow chart describing operation of the method for estimating a DUC value of a PHEV in accordance with the second embodiment of the present invention.

Referring now to FIG. 7, with continual reference to FIGS. 4, 5, and 6, a flow chart 200 describing operation of the method for estimating a DUC value in accordance with the second embodiment of the present invention is shown. Briefly, operation processes of the method are implemented by, for instance, controller 10 of the PHEV.

As shown in FIG. 7, the operation of the method includes the same processes associated with blocks 102, 104, 106, 108, 110, and 112 of the method in accordance with the first embodiment of the present invention as described with respect to FIG. 3. Accordingly, augmented historical database 112 is generated as indicated in FIG. 7. As described above, augmented database 112 includes a plurality of records each associated with a respective charging event. Each record for a charging event includes temporal information (i.e., DOW and TOD) of the charging event, the charge location of the charging event, and the journey distance associated with the charging event.

Augmented database 112 may be filtered to create an augmented filtered historical database (HistDB$_{Augmented\_Filtered}$) 216 as shown in block 214. As indicated above, it is possible to pre-filter the data before calculating transition probability matrix 140 based on TOD and DOW historical usage data as described above with respect to FIG. 3.

Next, transition probability matrix 140 is calculated as indicated in block 142. Probability matrix 140 is calculated using the data from augmented database 112 as described above. Of course, if filtered database 216 is created, then transition probability matrix 140 is calculated using the data from filtered database 216 as described above.

Journey matrix 150 is calculated as indicated at block 152. Again, journey matrix 150 is calculated using the data from augmented database, or from filtered database 216 if applicable, as described above.

In turn, the final estimated DUC value 120 is then calculated in block 222 based on probability matrix 140 and journal matrix 150 as described above.

As described, embodiments of the present invention provide methods for estimating the DUC value of a PHEV. The DUC value is to be used by a battery usage optimization system of the PHEV to optimize the battery usage. The methods augment or improve DUC value estimation for a PHEV by using location information such as obtained from a global-positioning system (GPS) associated with the vehicle.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
upon a vehicle being charged at a location, estimating a distance until charge (DUC) value based only on distances traveled by the vehicle between (i) prior recharges at the same location and (ii) subsequent recharges immediately following the prior recharges, at least two of the subsequent recharges are at different locations;
adapting battery usage per the DUC value to operate the vehicle in a charge depleting mode until an expected recharge.

2. The method of claim 1 further comprising:
storing, for each of a plurality of past charging events of the vehicle, information indicative of the location of the past charging event and distance traveled by the vehicle since the past charging event until the next charging event; and
obtaining the location of a current charging event of the vehicle.

3. The method of claim 2 wherein:
the DUC value is estimated as being one of the average or the mean of the distance traveled by the vehicle since a past charging event until the next charging event for each past charging event having the same location as the current charging event.

4. The method of claim 2 further comprising:
storing, for each of the plurality of the past charging events, temporal information indicative of when the charging event occurred; and
obtaining temporal information indicative of when the current charging event occurs;
wherein estimating a DUC value includes estimating the DUC value based on the stored information for each past charging event having the same location as the current charging event and having temporal information corresponding to the temporal information of the current charging event.

5. The method of claim 4 wherein:
the temporal information for each past charging event includes at least one of Time of Day (TOD) and Day of Week (DOW) when the past charging event occurred;
wherein the temporal information for the current charging event includes at least one of TOD and DOW when the current charging event occurs.

6. The method of claim 2 wherein:
storing, for each of the past charging events, information indicative of the location of the charging event includes using a global positioning system (GPS) associated with the vehicle to determine the location of the vehicle during the past charging event;
wherein obtaining the location of the current charging event of the vehicle includes using the GPS to determine the location of the vehicle during the current charging event.

7. The method of claim 2 wherein:
storing, for each of the past charging events, information indicative of distance traveled by the vehicle since the past charging event until the next charging event includes using at least one of a global positioning system and an odometer of the vehicle to determine the distance traveled by the vehicle since the past charging event until the next charging event.

8. The method of claim 1 wherein:
the DUC value is estimated as being one of an average or a mean of the distance traveled by the vehicle between the prior recharges and the subsequent recharges.

9. The method of claim 1 wherein:
the at least two of the subsequent recharges that are at different locations are at locations different than the location of the current recharge.

10. A vehicle comprising:
a battery;
a controller configured to, upon the battery being charged at a charge location, estimate a distance until charge (DUC) value based only on distances traveled by the vehicle between (i) prior recharges at a same location as the charge location and (ii) subsequent recharges immediately following the prior recharges, wherein at least two of the subsequent recharges are at different locations from one another; and
the controller further configured to adapt usage of the battery per the DUC value so that the vehicle is operated in a charge depleting mode an entire distance the vehicle is intended to be driven until a next charging event.

11. The vehicle of claim 10 wherein:
the DUC value is estimated as being one of an average or a mean of the distance traveled by the vehicle between the prior recharges and the subsequent recharges.

12. The vehicle of claim 10 wherein:
the at least two of the subsequent recharges that are at different locations from one another are at locations different than the location of the current recharge.

* * * * *